United States Patent
Yamagishi (10) Patent No.: US 7,413,164 B2
(45) Date of Patent: Aug. 19, 2008

(54) SEALING MEMBER

(75) Inventor: Norio Yamagishi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/283,679

(22) Filed: Nov. 22, 2005

(65) Prior Publication Data
US 2006/0102866 A1    May 18, 2006

Related U.S. Application Data

(63) Continuation of application No. PCT/JP2005/003678, filed on Feb. 25, 2005.

(30) Foreign Application Priority Data
Feb. 27, 2004  (JP) .............................. 2004-053542

(51) Int. Cl.
*F16K 1/00* (2006.01)
*F16L 17/00* (2006.01)
*F16J 15/02* (2006.01)
(52) U.S. Cl. ................... 251/333; 277/626; 277/549; 277/644; 277/642; 251/356
(58) Field of Classification Search ............. 251/333, 251/334, 144, 356; 277/641–644, 650, 549, 277/551–552, 560, 566, 626
See application file for complete search history.

(56) References Cited

U.S. PATENT DOCUMENTS

| 3,231,289 | A | * | 1/1966 | Carrell ..................... 277/644 |
| 3,401,915 | A | * | 9/1968 | Kim ......................... 251/174 |
| 3,558,097 | A |   | 1/1971 | DeFrees |
| 4,163,544 | A | * | 8/1979 | Fowler et al. .............. 251/328 |
| 4,254,960 | A | * | 3/1981 | Jelinek ..................... 277/644 |
| 4,616,857 | A | * | 10/1986 | Woodman et al. .......... 277/626 |
| 5,230,520 | A | * | 7/1993 | Dietle et al. ............... 277/559 |
| 6,089,543 | A | * | 7/2000 | Freerks ..................... 251/357 |
| 6,305,695 | B1 | * | 10/2001 | Wilson ..................... 277/644 |
| 6,315,302 | B1 | * | 11/2001 | Conroy et al. ............. 277/559 |
| 6,321,939 | B1 | * | 11/2001 | Treat et al. ................ 222/2 |
| 6,523,833 | B1 | * | 2/2003 | Ishigaki et al. ............ 277/650 |

(Continued)

FOREIGN PATENT DOCUMENTS

EP          1 293 709 A1      3/2003

(Continued)

*Primary Examiner*—John Rivell
*Assistant Examiner*—Andrew J Rost
(74) *Attorney, Agent, or Firm*—Oliff & Berridge, PLC (57) ABSTRACT

A rubber (elastic substance) is attached by vulcanization and an annular sealing member 4 is formed in an annular groove 3 having a step and provided in the bottom wall of a body 2 of a valve disc 1. The sealing member 4 has an annular portion 41 and an annular portion 42. Most of the annular portions 41, 42 are located in a deep groove portion 31 and a shallow groove portion 32, respectively, and the volume of the annular portion 41 is larger than the volume of the annular portion 42. Furthermore, an annular protrusion 43, which protrudes downward, is provided in the boundary region between the annular portions 41, 42. An inclined section that is inclined at the prescribed inner angle Q is also formed in the boundary region.

20 Claims, 5 Drawing Sheets

U.S. PATENT DOCUMENTS

| | | | |
|---|---|---|---|
| 6,629,682 B2 * | 10/2003 | Duelli | 251/158 |
| 6,669,205 B2 * | 12/2003 | Schenk | 277/628 |
| 6,932,354 B2 * | 8/2005 | Kane et al. | 277/608 |
| 2003/0151018 A1 | 8/2003 | Teshima et al. | |

FOREIGN PATENT DOCUMENTS

| | | |
|---|---|---|
| JP | Y2-53-033851 | 8/1978 |
| JP | A-05-215244 | 8/1993 |
| JP | U-05-73368 | 10/1993 |
| JP | A-09-222198 | 8/1997 |
| JP | Y2-2568815 | 1/1998 |
| JP | A-10-281055 | 10/1998 |
| JP | A-11-013995 | 1/1999 |
| JP | A-11-125343 | 5/1999 |
| JP | A-2000-265814 | 9/2000 |
| JP | A-2001-512897 | 8/2001 |
| JP | A-2002-181057 | 6/2002 |
| JP | A-2002-213316 | 7/2002 |
| JP | A-2002-310307 | 10/2002 |
| JP | A-2003-240149 | 8/2003 |
| JP | A-2003-247696 | 9/2003 |
| WO | WO 99/03132 A1 | 1/1999 |

* cited by examiner

SEALING MEMBER

This is a Continuation of International Application No. PCT/JP2005/003678 filed Feb. 25, 2005, which claims the benefit of Japanese Patent Application No. 2004-053542 filed Feb. 27, 2004. The entire disclosure of the prior applications is hereby incorporated by reference herein in its entirety.

BACKGROUND OF THE INVENTION

The present invention relates to a sealing member and a sealing structure provided in a valve installed, e.g., in a pressure vessel or a fluid flow path filled with fluid under a high pressure.

Gas tanks filled under a high pressure (high degree of compression) with hydrogen gas or natural gas as a fuel gas are carried on natural gas vehicles or fuel cell vehicles. For example, the filling amount of hydrogen gas of 35 MPa and 70 MPa is discussed within a framework of regulations relating to hydrogen gas supply stations and high-pressure hydrogen vessels based on high-pressure gas safety rules that have been studied in the governmental agencies. There are a variety of gas tanks filled with such high-pressure gases, e.g., metal or plastic tanks, but in the field of vehicles, pressure vessels made from a fiber-reinforced plastic (FRP) in which a liner is covered with an outer shell of a FRP are mainly used due to high strength and small weight thereof.

Valves for blocking the flow of fluid, which are called shut valves, are typically installed in intake and release openings for fluid in the pressure vessels for storing and discharging various high-pressure fluids (liquids, gases) in various applications including the above-mentioned automotive applications. Furthermore, a sealing structure having a sealing member is usually provided in the valve to ensure reliable sealing of the fluid. As an example of such a sealing structure, a structure for sealing a sleeve (mouthpiece) where a valve is installed by using an elastic sealing member such as an O ring is disclosed in Japanese Patent Application Laid-open No. 11-13995. Sealing structures using such O rings are widely used in the valves themselves. Furthermore, structures using angular rings rather than O rings and structures in which a rubber material serving as an elastic substance (material) is joined with the valve by vulcanization molding are also known.

However, if the pressure in the pressure vessel is increased, for example, to the above-mentioned 35 MPa or 70 MPa, the difference in pressure between the spaces that have to be separated and sealed with a valve becomes extremely high. As a result, in a sealing structure using the conventional sealing member such as an O ring, the sealing member is deformed by the difference in pressure and sometimes there is a risk of the sealing member being pushed out from the groove into which it was fit. Therefore, sufficient sealing performance cannot be achieved. Furthermore, in structures in which a rubber material is joined to a valve by vulcanization valve, the deformation caused by the aforementioned difference in pressure is also significant and a sufficient sealing performance cannot be attained.

In the latter case, a groove where the rubber material is vulcanized and joined can be made very shallow and a very thin rubber material can be used with the object of inhibiting the deformation of the rubber material. However, in order to conduct the vulcanization molding, a groove depth above a certain fixed value has to be ensured. Furthermore, increasing the hardness of the rubber material can be considered as means for improving resistance to deformation. However, rubbers with a certain high hardness tend to be difficult to unit each other by vulcanization molding. According to the information known to the inventors, if the difference in pressure between the spaces that have to be sealed with a valve exceeds approximately 20 MPa (or approximately several MPa for some valve sealing materials and structures), the required sufficient sealing performance is difficult to achieve and hermeticity of vessels is difficult to maintain with the above-described conventional sealing structures. Furthermore, the same problem is associated not only with the pressure vessels, but also with shut valves in fluid flow paths where a large pressure difference is generated between the spaces that have to be sealed.

The present invention has been made in view of the above circumstances and has for its object to provide a sealing member in which a sufficient sealing can be attained even when the difference in pressure between the spaces that have to be sealed with a valve exceeds several tens of MPa (or several MPa).

SUMMARY OF THE INVENTION

In order to resolve the above-described problems, the present invention provides a sealing member which comprises an elastic substance (material) and is provided in any one of a valve disc (element) and valve seat composing a valve provided so as to disconnect (cut off) communication between a first space having a first pressure and a second space having a second pressure that is lower than the first pressure, this sealing member comprising a first annular portion formed on the side of the first space, having the first pressure applied thereto, and having a first volume and a second annular portion formed on the side of the second space, having the second pressure applied thereto, and having a second volume that is less than the first volume.

With the sealing member of such a configuration, for example, when the sealing member is provided at the valve disc, if the valve disc comes close to the valve seat and the sealing member abuts against the valve seat when the valve is closed, the first space and the second space are insulated from each other. At this time, the first pressure is applied to the first annular portion, but the second pressure is applied to the second annular portion. Because the first pressure is higher than the second pressure, the sealing member is pressed from the first annular portion toward the second annular portion correspondingly to the difference in pressure.

At this time, because the volume of the first annular portion is larger than that of the second annular portion, the elastic substance flows from the first annular portion into the second annular portion. As a result, the sealing pressure created by contact of the elastic substance and valve seat in the second annular portion can be increased. Furthermore, because the excess volume that was so to speak allocated in advance to the first annular portion moves to the second annular portion, strains in the entire sealing member are relaxed, large deformation is prevented, and peeling of the sealing member from the valve disc or similar negative effects are inhibited. Such a state is maintained even when the valve disc further moves to the valve seat and the entire valve disc abuts against the valve seat. The same effect is demonstrated when the sealing member is provided at the valve seat (same hereinbelow).

Preferably, the other of the valve disc and the valve seat, that is, the one on which the sealing member is not mounted, and the sealing member are formed so that a gap is defined on the side of the second annular portion when they are abutted in a state where said first pressure is assumed to be equal to said second pressure (in other words, the case where a state is assumed in which there is no difference in pressure between the first space and the second space).

The volume of the elastic substance that can flow under the effect of the difference in pressure between the first space and the second space flows into the gap produced on the side of the second annular portion and at least part of this gap is filled with the elastic substance. That is, because the fluid portion of the elastic substance is received into the gap, the deformation of the elastic substance can be controlled according to the shape and capacity of the gap. As a result, inappropriate deformation of the entire sealing member can be inhibited even more effectively. Furthermore, contact ability of the sealing member and valve seat on the side of the second annular portion is improved and sealing pressure further increases.

In this case, it is desirable that the fluid quantity (volume) of the elastic substance be predetermined according to various conditions such as shape parameters of the sealing member, material properties of the elastic substance, deformation ability thereof (longitudinal modulus of elasticity, lateral modulus of elasticity), and difference in pressure between the first space and second space and that the gap be actually formed so that the volume thereof be equal to the fluid quantity of the elastic substance under various preset conditions. In such a case, the gap can be filled almost with the entire fluid portion of the elastic substance produced by the difference in pressure. Therefore, the occurrence of deviation of stresses inside the sealing member is relaxed, residual stresses are reduced, and the deformation of the entire sealing member is prevented even more reliably.

More specifically, an annular protrusion may be provided at the boundary region of the first annular portion and the second annular portion at the surface facing the other of the valve disc and the valve seat (the one where the sealing member is not mounted).

In this event, when the valve disc and valve seat come close to each other, the annular protrusion is the first to abut against the valve seat. As a result, an annular space region is provided by the second annular portion, annular protrusion, and valve seat. This space region functions as the above-described gap.

More preferably, the first annular portion has a first annular recess formed at the surface facing the other of the valve disc and the valve seat (the one where the sealing member is not mounted) and the second annular portion has a second annular recess formed at the surface thereof. In this case, when the valve disc and valve seat come close to each other, the region (zone) between the first annular recess and second annular recess can be the first to abut against the valve seat. Furthermore, the space region formed by the second annular recess and valve seat functions as the above-described gap and the volume thereof is easy to adjust.

Further preferably, the boundary region between the first annular portion and the second annular portion is formed so that the thickness decreases gradually from the first annular portion to the second annular portion.

The "thickness" as referred to herein is the length (height) in the direction perpendicular to the plane direction of the sealing member with an annular shape (same hereinbelow). With such a configuration, an inclined region having a slope from the first space to the second space is formed between the first annular portion and second annular portion. Therefore, the elastic substance can easily flow from the first annular portion to the second annular portion. Consequently, the increase in internal strains (distortions) caused by obstruction of flow of the elastic substance and the occurrence of extreme deformation caused thereby are inhibited.

More specifically, the first annular portion may have a substantially rectangular cross sectional shape and the second annular portion may have a substantially rectangular cross sectional shape.

Furthermore, the deformation of the sealing member can be easily controlled as desired if the thickness Db of the second annular portion is substantially half the thickness Da of the first annular portion.

The deformation of the sealing member can be controlled even easier if the effective width Dc of the sealing member is twice or more as large as the thickness Da of the first annular portion.

Preferably, the first annular portion has a first peripheral portion, which is positioned on the side of the first space and faces the other of the valve disc and the valve seat, the first peripheral portion is formed so as to extend to the side of the first space, and the second annular portion has a second peripheral portion, which is positioned on the side of the second space and faces the other of the valve disc and the valve seat, the second peripheral portion is formed so as to extend to the side of the second space. In this case, sealing capability in the first peripheral portion and second peripheral portion is improved and the deformation of the sealing member in the first peripheral portion and second peripheral portion is easily released toward the first space and second space.

More specifically, the first peripheral portion of the first annular portion is formed to have a tapered cross-sectional shape, and the second peripheral portion of the second annular portion is formed to have a tapered cross-sectional shape. In even more preferred configuration the tapered surface of the first peripheral portion of the first annular portion has a curved shape, and the tapered surface of the second peripheral portion of the second annular portion has a curved shape. In those cases, the tapered surface is preferably formed on the peripheral portion of such as a groove of any one of the valve disc and valve seat where the sealing member is provided. As a result, when the sealing member is united by vulcanization with this groove, the elastic substance constituting the sealing member easily flows into the groove.

More specifically, the annular protrusion preferably has a substantially trapezoidal cross section. The first annular portion preferably has a substantially trapezoidal cross section, and the second annular portion preferably has a substantially trapezoidal cross section.

More preferably, the abutment surface of the boundary region, which is formed between the first annular portion and second annular portion, abutting any one of the valve disc and valve seat where the sealing member is provided, is formed to have a substantially linear cross section. Thus, the deformation flow of the sealing member can smoothly proceed from the first annular portion to the second annular portion and the inappropriate deformation can be inhibited even more substantially.

In this case, it is especially preferred that the inner angle Q of the slope of the abutment surface of the boundary region with respect to the surface (that is, the plane direction of the sealing member) of the other of the valve disc and the valve seat falls within a range of 45°±5°.

In addition, the sealing member is preferably composed of a plurality of members with mutually different longitudinal modulus of elasticity (Young's modulus) and hydrogen permeability. According to this, both the desired elasticity and the necessary gas barrier properties required for the sealing member can be easily provided.

As described above, because the sealing member according to the present invention comprises a first annular portion with a comparatively large volume and a second annular portion with a comparatively small volume, the elastic substance can flow from the first annular portion where a higher pressure is applied to the second annular portion, and thus, a sufficient sealing pressure (surface pressure) can be attained. Accordingly, if the sealing member according to the present invention is provided in the valve installed in a pressure vessel, sufficient sealing capability can be attained even when the difference in pressure between the spaces that are to be sealed with the valve exceeds several tens of MPa.

DETAILED DESCRIPTION OF THE INVENTION

The embodiments of the present invention will be explained in details Hereinafter. Identical members will be assigned with identical reference numeral or symbol and redundant explanation thereof will be omitted. Mutual arrangements, e.g., in the up-down and left-right directions, will be based on the mutual arrangement shown in the figures, unless stated otherwise. Dimensional proportions in the figures are not limited to the proportions shown in the figures.

Figure 4:
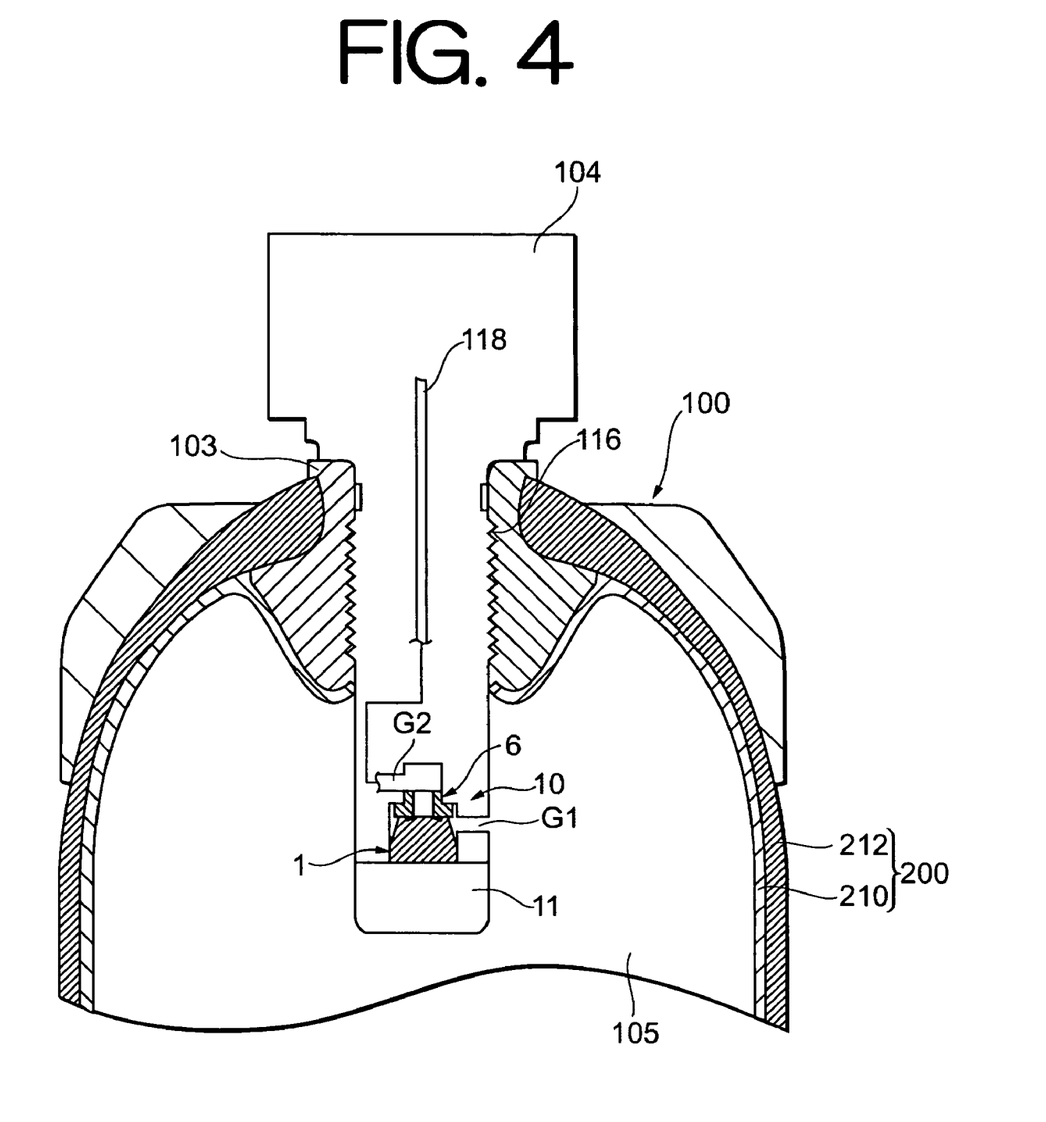
FIG. 4 is a schematic cross-sectional view indicating an example of a high-pressure tank using an embodiment of the sealing member according to the present invention.

FIG. 4, as described above, is a schematic cross-sectional view indicating an example of a high-pressure tank using an embodiment of the sealing member according to the present invention. The high-pressure tank 100 comprises a tank body 200 having as a whole a substantially cylindrical shape, a sleeve (mouthpiece) 103 provided at one end of the tank body in the longitudinal direction thereof, and a valve assembly 104 detachably attached to the sleeve 103. The inside of the tank body 200 serves as a storage space 105 for retaining a fluid such as a gas, for example, a natural gas or hydrogen, under a high pressure. When the high-pressure tank 100 is employed for a fuel cell system, for example, hydrogen gas under a pressure of 35 MPa to 70 MPa or a CNG (compressed natural gas) under a pressure of 20 MPa is tightly sealed and held inside the storage space 105.

Furthermore, the tank body 200 has a double-wall structure in which an inner liner 210 (inner shell) having gas barrier properties is coated on the outside with a shell 212 (outer shell) composed of a FRP. The liner 210 is formed, for example, from a resin such as high-density polyethylene. However, the tank body 200 may be also a metal container, for example, from an aluminum alloy. Furthermore, the gas retained inside the tank body 200 can be supplied to the storage space 105 from an external gas line via the valve assembly 104 attached to the sleeve 103 and released to the external gas line via this valve assembly 104.

The region between the sleeve 103 and tank 200 is airtightly sealed with a plurality of sealing members (not shown in the figures). Furthermore, a internal thread 116 is formed on the outer peripheral surface of the open portion of the sleeve 103. The valve assembly 104 is connected by screwing to the opening of the sleeve 103 via the internal thread 116. Furthermore, a flow path 118 to connect the external gas line to the storage space 105 is provided in the valve assembly 104.

A variety of pipe elements such as valves and couplings are integrally assembled in the valve assembly 104. For example, the valve assembly 104 comprises a shut valve 10 serving as a main valve disposed on the flow path 118 and a regulator (valve; not shown in the figure) disposed on the flow path 118 in series with the shut valve 10. The shut valve 10 and regulator may be also arranged in reverse order, and the shut valve 10 may be installed and connected to the sleeve 103 separately from the valve assembly 104, rather than being assembled integrally with the valve assembly 104.

The shut valve 10 comprises a valve disc 1 connected to a solenoid unit 11 for driving and a valve seat 6 disposed opposite the valve disc 1 at a certain distance therefrom. When the valve disc 1 is driven, the valve disc 1 and valve seat 6 are brought into intimate contact with each other, and the storage space 105 and flow path 118 are separated and sealed. Furthermore, a gas inlet G1 is provided upstream of the valve disc 1, and a gas outlet G2 connected to the flow path 118 is provided downstream of the valve seat 6.

Figure 5:
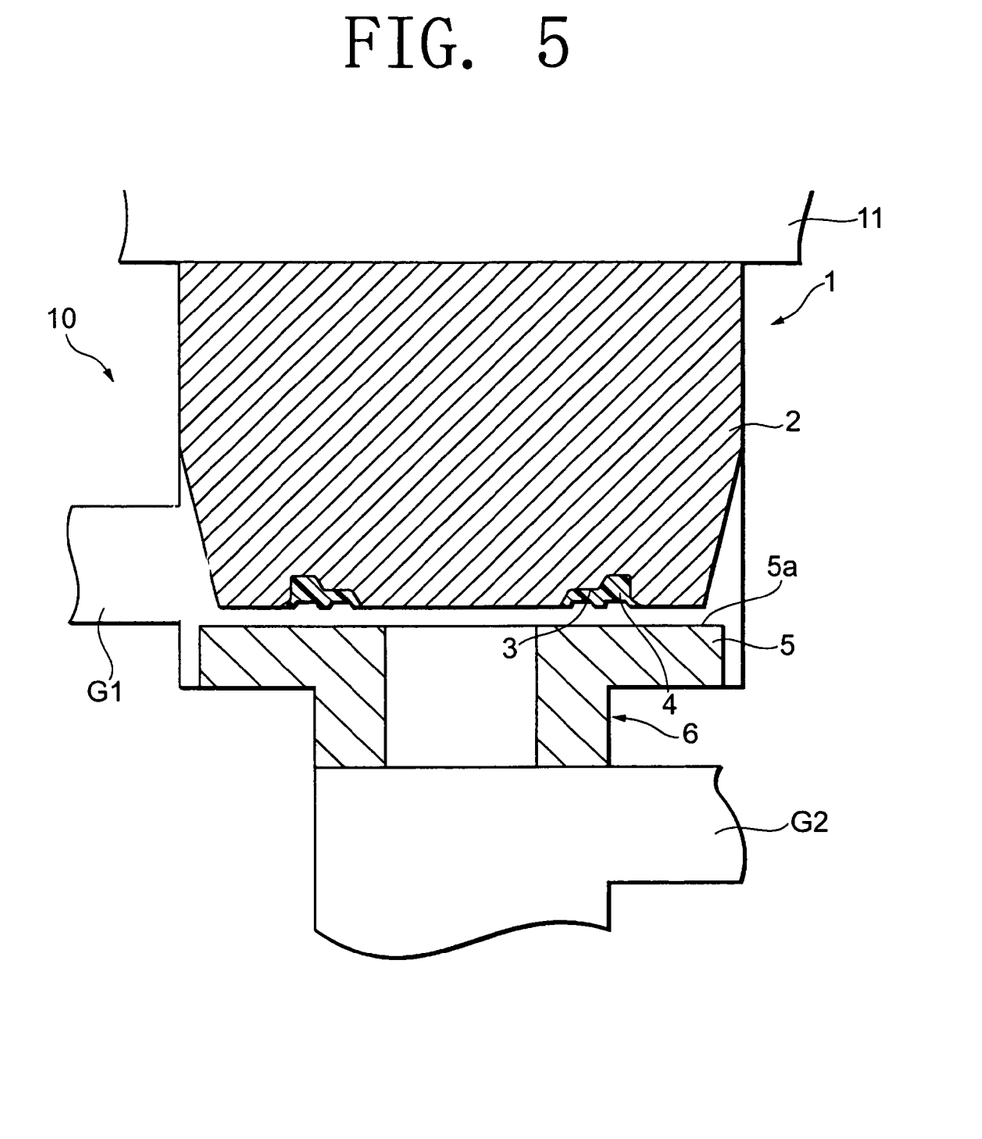
FIG. 5 is an enlarged cross-sectional view indicating the main components shown in FIG. 4.

As mentioned above, FIG. 5 is an enlarged cross-sectional view indicating main components shown in FIG. 4. In FIG. 5, the arrangement of components is shown so that the side of the storage space 105, that is, the upstream side is at the top of the figure.

In the valve disc 1, an elastic rubber is attached by vulcanization to an annular ring 3 having a step and provided in the bottom wall of a base body 2, and an annular sealing member 4 (sealing member of the present invention) is formed so as to be disposed opposite the upper surface 5a of the base 5 of the valve seat 6.

Figure 1:
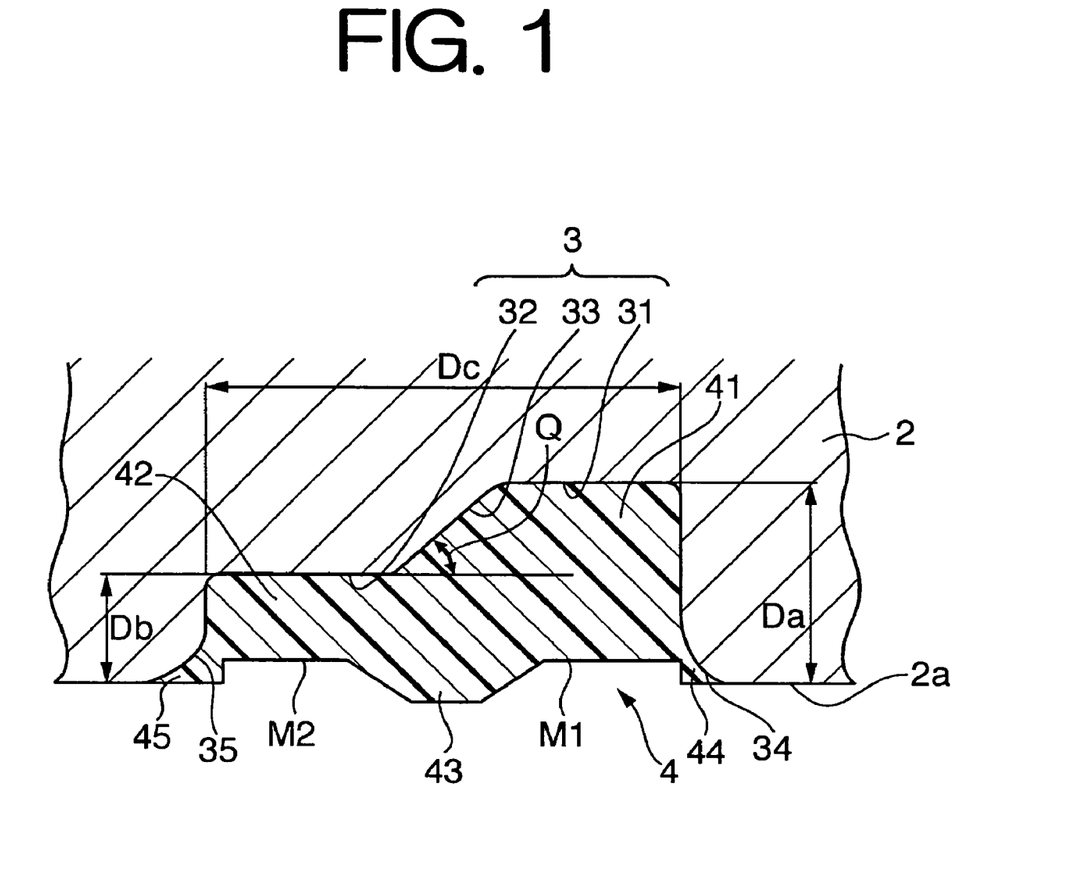
FIG. 1 is an enlarged view of the elements shown in FIG. 5 (the sealing member 4 according to the present invention and a peripheral part thereof)

Here, FIG. 1 is an enlarged view of the elements shown in FIG. 5 (that is, the sealing member 4 of the present invention and a peripheral part thereof). The sealing member 4 comprises an annular portion 41 (first annular portion and an annular portion 42 (second annular portion). Most of the annular portion 41 fills a comparatively deep portion (deep groove portion 31) of the annular groove 3. On the other hand, a large portion of the annular portion 42 fills a comparatively shallow portion (shallow groove portion 32) of the annular groove 3. With such a configuration, the annular portion 41 becomes thick and the annular portion 42 becomes thin and the relationship represented by the following formula (1) is satisfied:

$$V1 > V2 \tag{1}$$

Here, V1 and V2 is the volume of the annular portion 41 and annular portion 42, respectively.

In the annular groove 3, an inclined groove portion 33 having a substantially linear cross section is formed from the deep groove portion 31 to the shallow groove portion 32. As a result, an inclined section having a substantially linear cross section and inclined at an inner angle Q to the plane direction of the sealing member 4 is formed from the annular portion 41 to the annular portion 42. In other words, the sealing member 4 is so configured that the thickness thereof gradually decreases from the annular portion 41 to the annular portion 42.

Furthermore, in the sealing member 4, an annular protrusion 43 with a cross section of an inverted trapezoidal shape is provided, so as to protrude downward as shown in the figure, in the bottom wall serving as a boundary region of the annular portions 41, 42. Furthermore, an annular recess M1 (first annular recess) and an annular recess M2 (second annular recess) with a substantially trapezoidal cross section are formed at sections adjacent to the annular protrusion 43 in the annular portions 41, 42. Tapers 34, 35 with curved cross sections are formed on the sides of the annular portions 41, 42, respectively, so as to expand outwardly from the sealing member 4 in the peripheral rim (edge) of the open end of the annular groove 3. According the above configuration, the elastic substance can easily flow into the annular groove 3 when the sealing member 4 is attached by vulcanization. Furthermore, those taper 34, 35 portions are also filled with the elastic substance, and skirts 44, 45 (respective the first peripheral portion and second peripheral portion) are formed in the annular portions 41, 42.

In other words, the skirt 44 is provided so as to extend toward the below-described space K1, and the skirt 45 is provided so as to extend toward the below-described space K2. Furthermore, the outer surfaces of the skirts 44, 45 are formed to have a substantially curved cross section with the same curvature as the inner surface shape of the tapers 34, 35.

The operation (sealing mechanism) in the valve structure of the shut valve 10 comprising the sealing member 4 of the above-described configuration will be explained below. As described above, FIG. 2 is a schematic cross-sectional view indicating the state where the sealing member 4 provided in the valve disc 1 abuts against the base 5 of the valve seat 6. As shown in the figure, the valve such as a shut valve 10 comprising the valve disc 1 and valve seat 6 disconnects spaces K1, K2; the flow of such as the gas that is to be sealed is assumed to be directed from the outer peripheral portion (side of the gas inlet G1) of the valve to the central portion (side of the gas outlet G2), that is, from the space K1 to the space K2.

Figure 2:
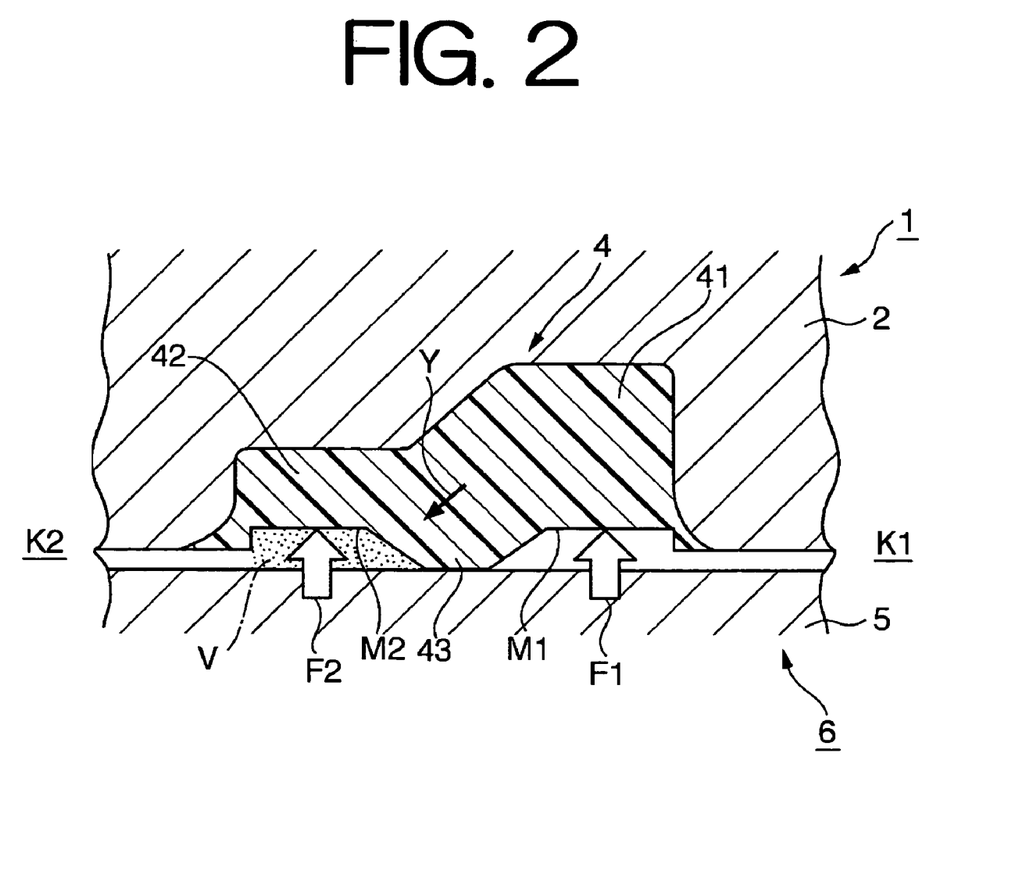
FIG. 2 is a schematic cross-sectional view indicating the state where the sealing member 4 provided in the valve disc 1 abuts against the base 5 of the valve seat 6.

Here, the pressure in the spaces K1, K2 is denoted by F1 (first pressure) and F2 (second pressure), respectively, further the relationship represented by the following formula (2) is satisfied:

$$F1 > F2 \quad (2)$$

For example, if the valve such as the shut valve 10 employing the sealing member 4 is a sealing valve of a hydrogen gas tank such as a high-pressure tank 100 of a fuel cell vehicle, then the pressure of hydrogen gas as a fluid inside the container (pressure F1) is taken as 35 MPa or 70 MPa at maximum, as described above. On the other hand, the pressure F2 on the release side is approximately an atmospheric pressure. Therefore, the difference in pressure ΔF between the spaces K1, K2 becomes very large.

The valve disc 1, for instance, as was described before, is provided in an electromagnetic valve comprising the solenoid unit 11 for driving, and the shut valve 10 is closed by the movement of the valve disc 1 to the fixed valve seat 6. If the valve disc 1 is closed, the distal end surface of the annular protrusion 43, which protrudes downward from the bottom surface 2a of the base body 2 of the valve disc 1 is the first to be abutted against the surface of the base 5 of the valve seat 6 (see FIG. 2).

In this case, pressures F1, F2 are applied to the respective bottom surface of the annular recesses M1, M2 of the annular portions 41, 42. Because the pressure F1 is higher than the pressure F2, as mentioned above, a large stress is generated from the annular portion 41 to the annular portion 42 in the sealing member 4 as a whole, unless there is a very large difference in surface area of the inner walls of the annular recesses M1, M2, and the elastic substance flows in the direction shows by an arrow Y in the figure.

Furthermore, on the side of the annular portion 42, a gap V is formed by the inner wall surface of the annular recess M2 and the upper surface of the base 5 of the valve seat 6, and the sealing member 4 is so deformed that the flowing portion of the elastic substance flows into the gap V. In other words, the elastic substance that was deformed and caused to flow by the difference in pressure ΔF is received in the gap V.

The gap V is thus filled with the elastic substance, and the sealing member 4 and the upper surface of the base 5 of the valve seat 6 can be brought into contact not only at the annular protrusion 43, but also on the side of the annular portion 42. Therefore, an excessively large deformation of the sealing member 4 can be inhibited and the sealing member 4 can be prevented from peeling from the annular groove 3. As a result, even in the case of an ultrahigh difference in pressure ΔF that exceeds several tens of MPa (or several MPa), the sealing member 4 can achieve reliably a sufficient sealing performance. Therefore, the spaces K1, K2 can be completely disconnected without any leak of a fluid such as gas, by further closing the valve disc 1 and bringing it into contact with the valve seat 6.

Furthermore, because the annular recess M2 is formed in the annular portion 42, the gap V of a certain capacity is easily formed and the volume Vv thereof can be easily adjusted. Moreover, because the inclined groove portion 33 is provided, as described above, an inclined region having downward slope from the space K1 to the space K2 exists between the annular portions 41, 42 (in other words, in the intermediate region in the plane direction of the sealing member 4). Consequently, the elastic substance easily flows in the direction shown by the arrow Y in the figure. Therefore, deviation of stresses inside the sealing member 4 that can appear when the flow of the elastic substance is impeded, and strain deviation caused thereby and extreme deformation can be inhibited.

The fluid quantity of the elastic substance differs depending on the difference in pressure ΔF, shape parameters of the sealing member 4, material of the elastic substance, modulus of elasticity, and the like. Therefore, it is preferred that the fluid quantity of the elastic substance is determined in advance under various conditions affecting the fluid quantity of the elastic substance and that the gap V is actually formed so that the volume Vv thereof be equal to the fluid quantity of the elastic substance under preset conditions. In such a case, the gap V is filled almost with the entire fluid portion (that is, deformed portion) of the elastic substance and, therefore, additional excess deformation of the entire sealing member 4 can be inhibited. As a consequence, the deformation of the sealing member 4 can thus be controlled in the desired manner and the sealing performance attained with the sealing member 4 can be further improved.

The shape parameters of the sealing member and modulus of elasticity of the elastic substance are the factors that follow the fluid quantity of the elastic substance in terms of the effect produced on sealing ability of the sealing member 4, and the deformation control of the sealing member 4 is further facilitated by appropriately adjusting the volume Vv of the gap V. Furthermore, among the shape parameters of the sealing member 4, respective thicknesses Da, Db (height from the bottom surface 2a of the base body 2 of the valve disc 1) of the annular portions 41, 42, effective width Dc of the sealing member 4, and the value (see FIG. 1) of the inner angle Q (slope) of the inclined section formed by the inclined groove portion 33 are relatively important as the parameters controlling the deformation rate and fluid quantity of the sealing member 4.

Those parameters preferably satisfy the relations, for example, represented by the following formulas (3) to (5).

$$Db \approx Da/2 \qquad (3)$$

$$Dc \geqq Da \times 2 \qquad (4)$$

$$Q \approx 45° \qquad (5)$$

In the present embodiment where the sealing member 4 is vulcanized, in light of manufacturing process, a certain fixed dimension tends to be necessary for the thickness Da of the annular portion 41. More specifically, examples of possible dimensions include Da of approximately 1 mm, Db of approximately 0.5 mm, and Dc of approximately 2.5 mm. A range ±5° about the angle of 45° indicated by formula (5) is the preferred range for Q.

The inventors have conducted FEM analysis by assuming that rubber materials of two types, both which have the above mentioned shape and dimension, with a longitudinal modulus of elasticity (Young's modulus) of 4 MPa and 7 MPa as the elastic substance in sealing member 4, are used as the sealing member, and that the pressure difference ΔF is several MPa, and thus, evaluated the deformation degree of the sealing member 4. The same FEM analysis was also conducted with respect to a sealing member with a constant thickness Da (almost equivalent to the conventional angular ring) that has no step-like shape (that is, the shape without the division into the annular portions 41, 42).

As a result, the maximum main strain was observed in the distal end of the annular protrusion 43 in both the sealing member 4 according to the present invention and in the sealing member equivalent to the conventional product, the value of the main strain was somewhat different from another. However, a two-dimensional strain quantity map obtained in the cross section demonstrated that in the sealing member equivalent to the conventional product, the surface area where the significant strains occur is approximately 60-70% of the entire cross section area, whereas in the sealing member 4 according to the present invention, the surface area where the significant strains occur is approximately 20-30%. The same trend was observed with a different Young's modulus of the rubber material. Those results confirmed that in the sealing member 4, the flow of the elastic substance was appropriately facilitated and that the residual strains induced by stresses were sufficiently reduced.

Furthermore, according the above, it is confirmed that the sealing member according to the present invention is also effective regardless of the Young's modulus of the elastic substance material used in the sealing member 4. Therefore, the sealing member 4 may be formed by combining, e.g., by mixing, a plurality of members with different Young's modulus and hydrogen permeability. As a consequence, both the desired elasticity and gas barrier properties required for the sealing member 4 can be readily obtained at the same time.

As described above, FIG. 3 is a graph showing the analysis results on the surface pressure obtained when those sealing members (sealing member 4 of the present invention and the sealing member equivalent to the conventional product) mounted on the valve disc 1 shown in FIG. 5 abuts against the base 5 of the valve seat 6 and then further pressed to the base 5 by 0.1 mm. In the analysis model, the sealing member equivalent to the conventional product was assumed to have no step and the annular groove provided in the valve disc was also assumed to have no step. In the figure, the distance in the radial direction from the central axis of the valve disc 1 is plotted against the abscissa, and the region with a distance of approximately 4 mm to approximately 5.5 mm from the central axis corresponds to the region of the sealing member. Furthermore, curve L1 represents the results relating to the sealing member 4 of the present invention and curve L2 represents the results corresponding to the conventional sealing member.

Figure 3:
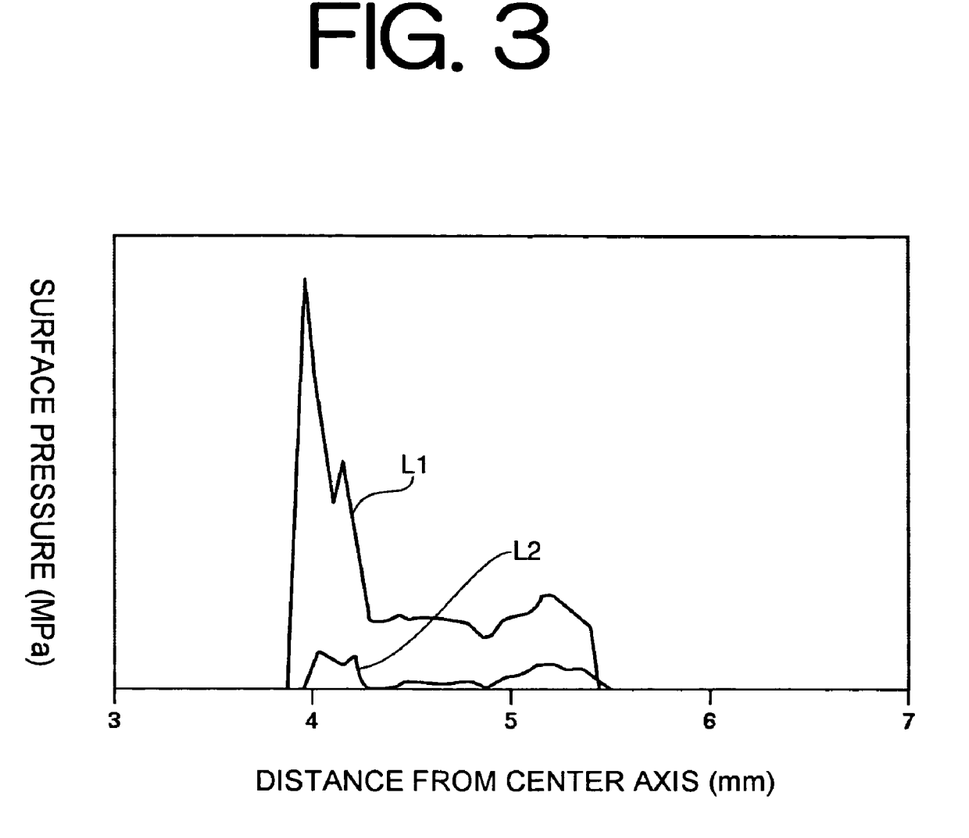
FIG. 3 is a graph showing the analysis results on the surface pressure obtained when the sealing member mounted on the valve disc 1 shown in FIG. 5 abuts against the base 5 of the valve seat 6 and then further pressed to the base 5 by 0.1 mm.

Those results indicate that in the sealing member 4 according to the present invention, the surface pressure on the base 5 was entirely and substantially increased over that in the conventional sealing member. In the above graph, numerical values on the ordinate are omitted, however, the maximum value (maximum surface pressure) on curve L1 was approximately 75 MPa. In particular, it was also confirmed that the surface pressure in the central region (the distance from the centre axis is 4.5 mm) of the sealing member equivalent to the conventional product was small, while that of the sealing member 4 of the present invention was substantially increased.

The present invention is not limited to the above-described embodiment and various modifications thereof are possible without departing from the essence thereof. For example, the annular groove 3 may be provided in the valve seat 6 while the sealing member 4 may be mounted thereon. Furthermore, the values of Da, Db, Dc, Q are presented above for purposes of illustration, and the preferred ranges are not necessarily limited to those examples, but the Da, Db, Dc, Q satisfying the above-described relationships are useful.

Because the sealing member according to the present invention provides for sufficient sealing even when the pressure difference between the spaces that have to be sealed exceeds several tens of MPa, it can be widely used, regardless of fluid properties, in valves provided where a difference in pressure can occur between the spaces that have to be sealed, for example, valves installed in various pressure vessels for fluids, shut-down valves provided in fluid flow paths, and devices, machines, equipment, and facilities such as natural gas vehicles and fuel cell vehicles in which pressure vessels are carried or placed and provided with fuel gas supply flow paths.

What is claimed is:

1. A sealing member which includes an elastic substance and is provided in any one of a valve disc and valve seat composing a valve provided so as to disconnect communication between a first space having a first pressure and a second space having a second pressure that is lower than said first pressure, the valve disc having an annular groove that includes an inclined portion, said sealing member comprising:
    a first annular portion formed on the side of said first space, with said first pressure applied thereto;
    a second annular portion formed on the side of said second space, with said second pressure applied thereto;
    an annular protrusion provided at a boundary region of said first annular portion and said second annular portion at a surface facing the other of said valve disc and said valve seat; and
    an inclined portion, provided behind said annular protrusion, having a shape that is inclined from said first space to said second space so as to come close to said annular protrusion,
    wherein the inclined portion of the annular groove is configured to cause the elastic substance to flow from the first annular portion to the second annular portion.

2. The sealing member according to claim 1, wherein the other of said valve disc and said valve seat, and said sealing member are formed so that a gap is defined on the side of said second annular portion when abutting in a state where said first pressure is low.

3. The sealing member according to claim 1, wherein
said first annular portion has a first annular recess formed at the surface facing the other of said valve disc and said valve seat, and
said second annular portion has a second annular recess formed at said surface.

4. The sealing member according to claim 3, wherein:
said first annular portion has a substantially trapezoidal cross section; and
said second annular portion has a substantially trapezoidal cross section.

5. The sealing member according to claim 1, wherein the boundary region between said first annular portion and said second annular portion is formed so that the thickness decreases gradually from said first annular portion to said second annular portion.

6. The sealing member according to claim 5, wherein an abutment surface of said boundary region, abutting any one of the valve disc and valve seat where said sealing member is provided, is formed to have a substantially linear cross section.

7. The sealing member according to claim 6, wherein an inner angle (Q) of the slope of said abutment surface of said boundary region with respect to the surface of the other of said valve disc and said valve seat is an angle within a range of 45°±5°.

8. The sealing member according to claim 1, wherein
said first annular portion has a substantially rectangular cross sectional shape, and
said second annular portion has a substantially rectangular cross sectional shape.

9. The sealing member according to claim 8, wherein the thickness (Db) of said second annular portion is substantially half the thickness (Da) of said first annular portion.

10. The sealing member according to claim 8, wherein the effective width (Dc) of said sealing member is twice or more as large as the thickness (Da) of said first annular portion.

11. The sealing member according to claim 1, wherein:
said first annular portion has a first peripheral portion which is positioned on the side of said first space and faces the other of said valve disc and said valve seat, and said first peripheral portion is formed so as to extend to the side of said first space; and
said second annular portion has a second peripheral portion which is positioned on the side of said second space and faces the other of said valve disc and said valve seat, said second peripheral portion is formed so as to extend to the side of said second space.

12. The sealing member according to claim 11, wherein:
said first peripheral portion of said first annular portion is formed to have a tapered cross-sectional shape; and
said second peripheral portion of said second annular portion is formed to have a tapered cross-sectional shape.

13. The sealing member according to claim 12, wherein:
the tapered surface of said first peripheral portion of said first annular portion has a curved shape; and
the tapered surface of said second peripheral portion of said second annular portion has a curved shape.

14. The sealing member according to claim 1, wherein said annular protrusion has a substantially trapezoidal cross section.

15. The sealing member according to claim 1, wherein said sealing member is composed of a plurality of members with mutually different longitudinal modulus of elasticity and hydrogen permeability.

16. The sealing member according to claim 1, wherein the radial cross sectional area of said second annular portion, which is along the radial direction thereof, is less than the radial cross sectional area of said first annular portion, which is along the radial direction thereof.

17. A valve wherein a sealing member according to claim 1 is provided in a valve disc or a valve seat.

18. A tank having a sealing member according to claim 1.

19. The sealing member according to claim 1, wherein a thickness of the sealing member decreases from the first annular portion to the second annular portion.

20. A valve for blocking the flow of fluid, the valve comprising:
a valve disc having a valve body, the valve body including an annular groove that has an inclined portion;
a valve seat;
a sealing member that includes:
an elastic substance provided in any one of the valve disc and the valve seat so as to disconnect communication between a first space having a first pressure and a second space having a second pressure that is lower than the first pressure;
a first annular portion formed on the side of the first space, with the first pressure applied thereto;
a second annular portion formed on the side of the second space, with the second pressure applied thereto;
an annular protrusion provided at the boundary region of the first annular portion and the second annular portion at the surface facing the other of the valve disc and the valve seat; and
an inclined portion, provided behind the annular protrusion, having a shape that is inclined from the first space to the second space so as to come close to the annular protrusion,
wherein the inclined portion of the annular groove is configured to cause the elastic substance to flow from the first annular portion to the second annular portion.

* * * * *